United States Patent
Kawahara

(10) Patent No.: US 10,467,149 B2
(45) Date of Patent: Nov. 5, 2019

(54) CONTROL APPARATUS, CONTROL METHOD, PROGRAM, AND INFORMATION PROCESSING APPARATUS

(71) Applicant: NEC Corporation, Minato-ku, Tokyo (JP)

(72) Inventor: Aoi Kawahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/905,999

(22) Filed: Feb. 27, 2018

(65) Prior Publication Data

US 2018/0267900 A1 Sep. 20, 2018

(30) Foreign Application Priority Data

Mar. 15, 2017 (JP) ................................. 2017-049682

(51) Int. Cl.
*G06F 12/10* (2016.01)
*G06F 15/173* (2006.01)
*G06F 15/76* (2006.01)

(52) U.S. Cl.
CPC ........ *G06F 12/10* (2013.01); *G06F 15/17331* (2013.01); *G06F 15/76* (2013.01); *G06F 2212/1008* (2013.01); *G06F 2212/657* (2013.01)

(58) Field of Classification Search
CPC .......... G06F 12/02; G06F 12/10; G06F 15/76; G06F 15/17331
USPC ....................................................... 711/203
See application file for complete search history.

(56) References Cited

U.S. PATENT DOCUMENTS

| | | | | |
|---|---|---|---|---|
| 7,509,391 | B1* | 3/2009 | Chauvel | G06F 12/1027 709/213 |
| 7,818,519 | B2* | 10/2010 | Plunkett | B41J 2/04505 711/158 |
| 2005/0188218 | A1* | 8/2005 | Walmsley | B41J 2/04505 726/22 |
| 2009/0024752 | A1* | 1/2009 | Shitomi | G06F 3/0605 709/230 |
| 2011/0296079 | A1* | 12/2011 | Kotzur | G06F 12/0246 711/103 |
| 2014/0068133 | A1* | 3/2014 | Tkacik | G06F 13/1694 710/308 |

(Continued)

FOREIGN PATENT DOCUMENTS

| | | |
|---|---|---|
| JP | 2013-114650 A | 6/2013 |
| JP | 2015-094974 A | 5/2015 |
| JP | 2016-091076 A | 5/2016 |

OTHER PUBLICATIONS

Japanese Office Action For JP Application No. 2017-049682 dated Oct. 24, 2017 with English Translation.

*Primary Examiner* — Pierre Miche Bataille

(57) ABSTRACT

A control apparatus includes: an external apparatus control unit configured to load data necessary for execution of calculation processing onto an external memory included by an external apparatus and also cause the external apparatus to execute the calculation processing; a memory access unit configured to convert a logical address used in the calculation processing into a physical address and also access the external memory on the basis of the converted physical address; and an external memory virtualizing unit configured to virtualize the external memory by associating the converted physical address with an external memory physical address that is a physical address in the external memory.

14 Claims, 12 Drawing Sheets

(56) References Cited

U.S. PATENT DOCUMENTS

2016/0371113 A1 12/2016 Aoyama et al.

* cited by examiner

CONTROL APPARATUS, CONTROL METHOD, PROGRAM, AND INFORMATION PROCESSING APPARATUS

INCORPORATION BY REFERENCE

This application is based upon and claims the benefit of priority from Japanese patent application No. 2017-049682, filed on Mar. 15, 2017, the disclosure of which is incorporated herein in its entirety by reference.

TECHNICAL FIELD

The present invention relates to a control apparatus, a control method, a program, and an information processing apparatus. More specifically, the present invention relates to a control apparatus that can perform a context switch, a control method, a program, and an information processing apparatus.

BACKGROUND ART

A computer including a controlling node (a control node) and an arithmetic node (a calculation node) is known.

For example, Patent Document 1 discloses an information processing apparatus that has a control core (a control node) with an operating system incorporated and at least one calculation core (a calculation node) controlled by the control core and configured to execute predetermined calculation processing. According to Patent Document 1, the control core has a calculation core control part that instructs a stopped calculation core to start calculation processing to be executed by the calculation core. Moreover, the calculation core includes a calculation processing control part that starts calculation processing in response to an instruction from the calculation core control part, and an exception detection part that detects exception processing having occurred during execution of calculation processing and stops execution of calculation processing in which exception processing has occurred. According to Patent Document 1, the abovementioned configuration makes it possible to suppress interference by the OS (Operating System) and so on.

Patent Document 1: Japanese Unexamined Patent Application Publication No. JP-A 2015-094974

In the case of the technique as disclosed by Patent Document 1, access to a memory included by the calculation node is performed, for example, in a manner that an arithmetic device such as a processor accesses a PCI (Peripheral Component Interconnect) memory space with the use of a mechanism of memory-mapped I/O. Herein, the size of the PCI memory space is set by BIOS (Basic Input Output System) or OS of the control node serving as a host. Therefore, even if the calculation node is equipped with a memory which is equal to or more than the PCI memory space supported by the control node, the size of a memory which can be used by the control node is limited to the size of the PCI memory space. Consequently, there has been a problem that it is difficult to efficiently utilize the memory mounted on the calculation node.

Further, the PCI memory space is a physical address. Therefore, for example, when a context switch to change calculation processing being executed in the calculation node is performed, if data loaded in the memory of the calculation node is simply saved, there is no data to be referred to at a physical address used by RDMA (remote Direct Memory Access) such as InfiniBand. Moreover, regarding sites which are not used by the RDMA, allocation of physical addresses is managed by an MMU (Memory Management Unit) of the host, so that it is required to reset the MMU in order to save the data. Because of the reasons as described above, with the technique disclosed by Patent Document 1, it is difficult to save data loaded in the memory of the calculation node when a context switch is performed. Consequently, there has been a problem that it is difficult to efficiently utilize the memory mounted on the calculation node.

Thus, there has been a problem that it is difficult to efficiently utilize the memory mounted on the calculation node.

SUMMARY OF THE INVENTION

Accordingly, an object of the present invention is to provide a control apparatus that solves the problem that a memory mounted on a calculation node cannot be efficiently utilized, a control method, a program, and an information processing apparatus.

In order to achieve the object, a control apparatus as an aspect of the present invention includes: an external apparatus control unit configured to load data necessary for execution of calculation processing onto an external memory included by an external apparatus and also cause the external apparatus to execute the calculation processing; a memory access unit configured to convert a logical address used in the calculation processing into a physical address and also access the external memory on the basis of the converted physical address; and an external memory virtualizing unit configured to virtualize the external memory by associating the converted physical address with an external memory physical address that is a physical address in the external memory.

Further, a control method as another aspect of the present invention is executed by a control apparatus. The control method includes: loading data necessary for execution of calculation processing onto an external memory included by an external apparatus and also causing the external apparatus to execute the calculation processing; converting a logical address used in the calculation processing into a physical address and also accessing the external memory on the basis of the converted physical address; and virtualizing the external memory by associating the converted physical address with an external memory physical address that is a physical address in the external memory.

Further, a non-transitory computer-readable medium storing a program as another aspect of the present invention is a non-transitory computer-readable medium storing a program including instructions for causing an information processing apparatus to realize: an external apparatus control unit configured to load data necessary for execution of calculation processing onto an external memory included by an external apparatus and also cause the external apparatus to execute the calculation processing; a memory access unit configured to convert a logical address used in the calculation processing into a physical address and also access the external memory on the basis of the converted physical address; and an external memory virtualizing unit configured to virtualize the external memory by associating the converted physical address with an external memory physical address that is a physical address in the external memory.

Further, an information processing apparatus as another aspect of the present invention has a control node with an operating system installed and a calculation node controlled by the control node. The control node includes: an external apparatus control unit configured to load data necessary for execution of calculation processing onto a memory included by the calculation node and also cause the calculation node to execute the calculation processing; a memory access unit configured to convert a logical address used in the calculation processing into a physical address and also access the memory on the basis of the converted physical address; and an external memory virtualizing unit configured to virtualize the memory by associating the converted physical address with an external memory physical address that is a physical address in the memory.

With the configurations as described above, the present invention can provide a control apparatus that solves the problem that it is difficult to efficiently utilize a memory mounted on a calculation node, a control method, a program, and an information processing apparatus.

EXEMPLARY EMBODIMENT

First Exemplary Embodiment

Figure 1:
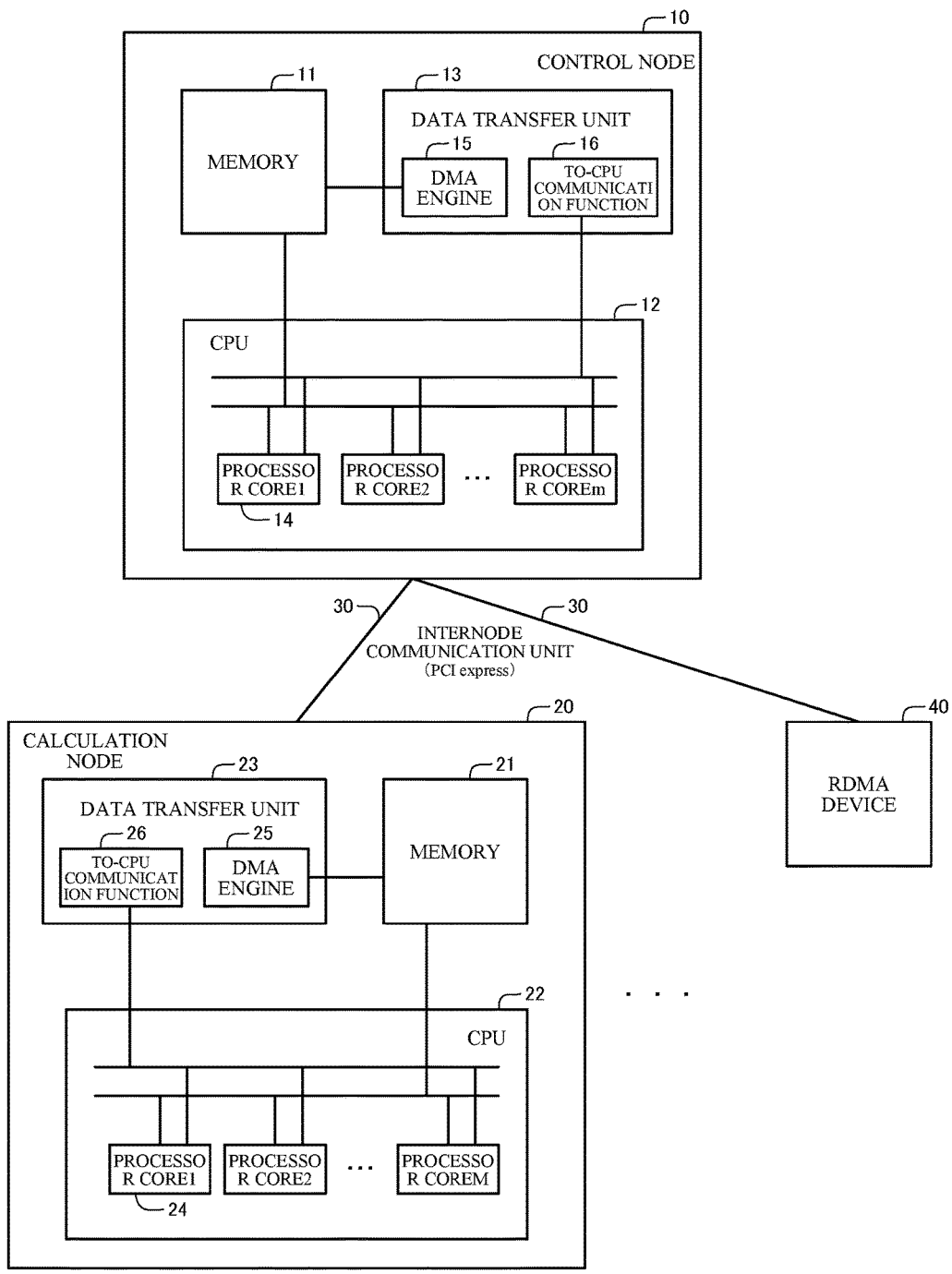
FIG. 1 is a block diagram showing an example of a configuration of a parallel computer in a first exemplary embodiment.
Figure 2:
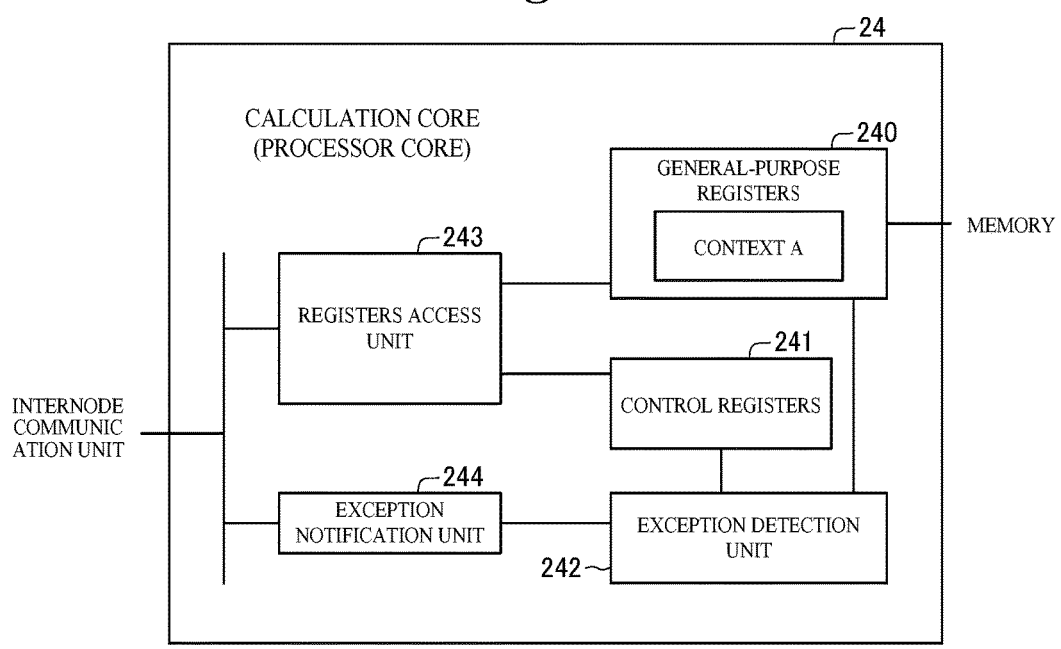
FIG. 2 is a block diagram showing an example of a configuration of a calculation core.
Figure 3:
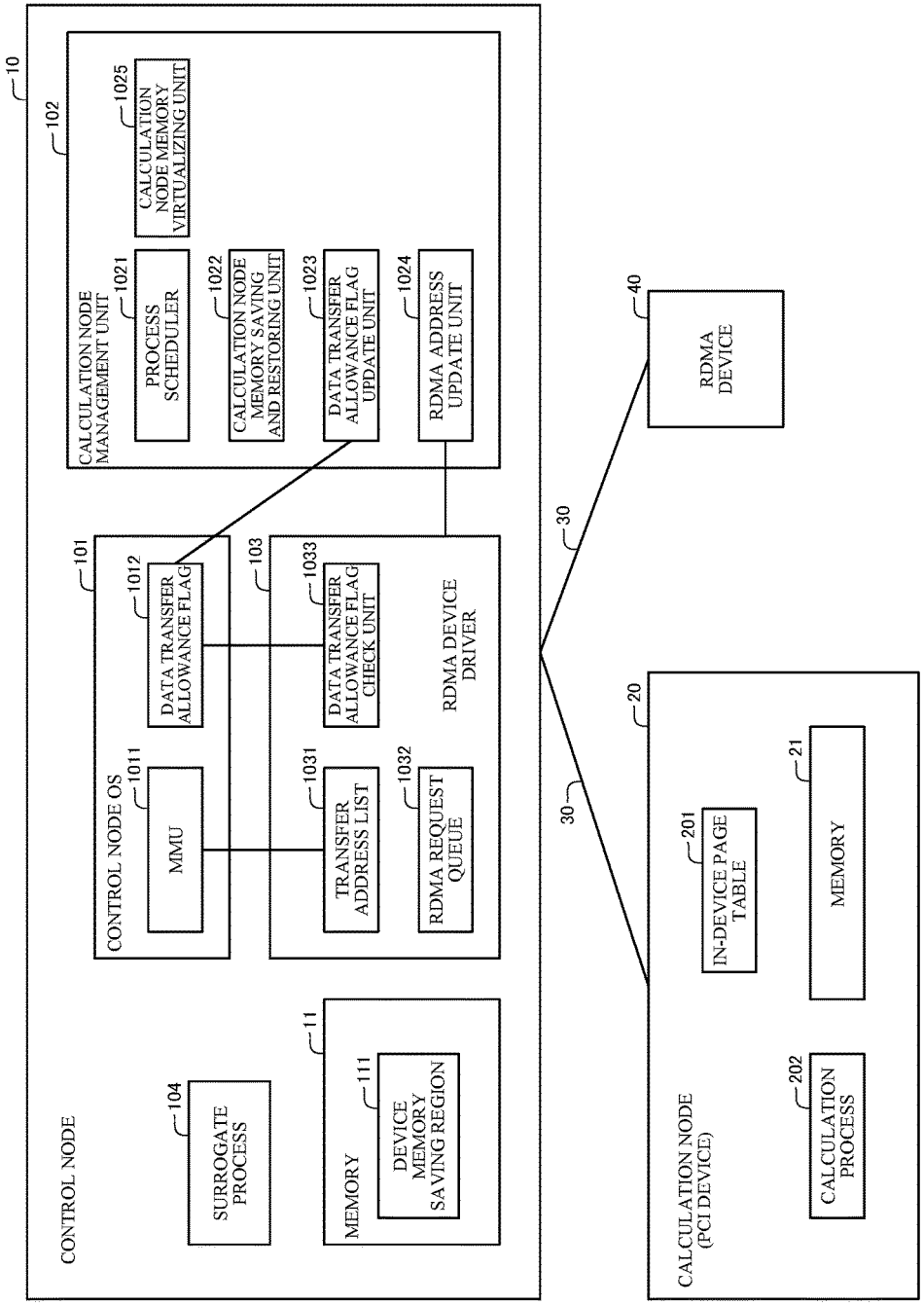
FIG. 3 is a block diagram showing an example of a detailed configuration of a control node and a calculation node included by the parallel computer.
Figure 4:
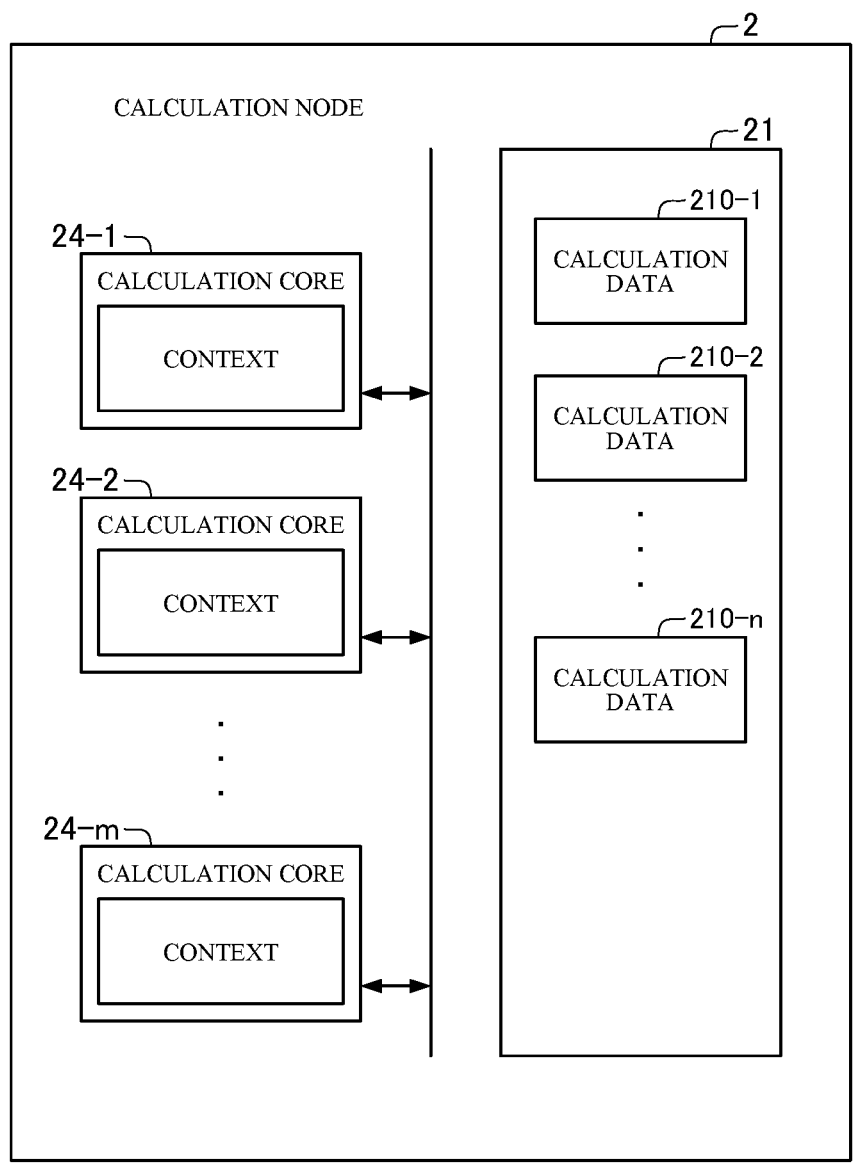
FIG. 4 is a block diagram showing an example of a configuration when the calculation node executes a calculation process.
Figure 5:
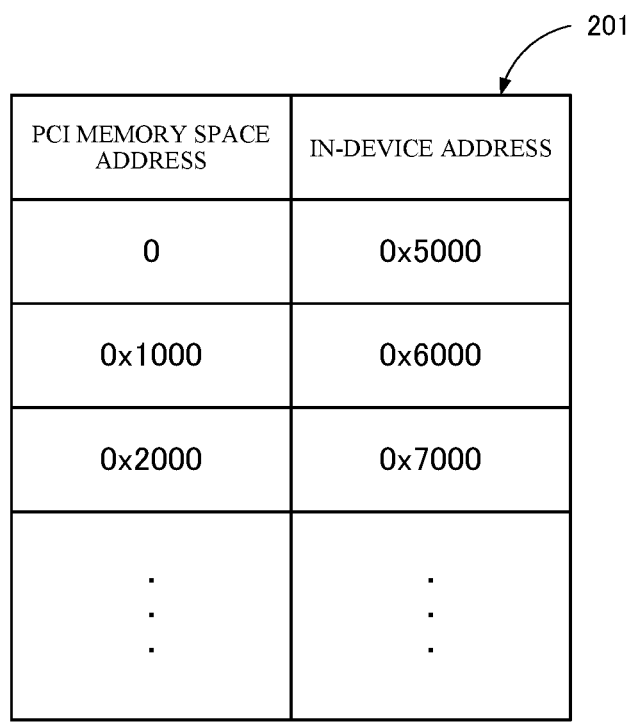
FIG. 5 is a diagram showing an example of a configuration of an in-device page table shown in FIG. 3.
Figure 6:
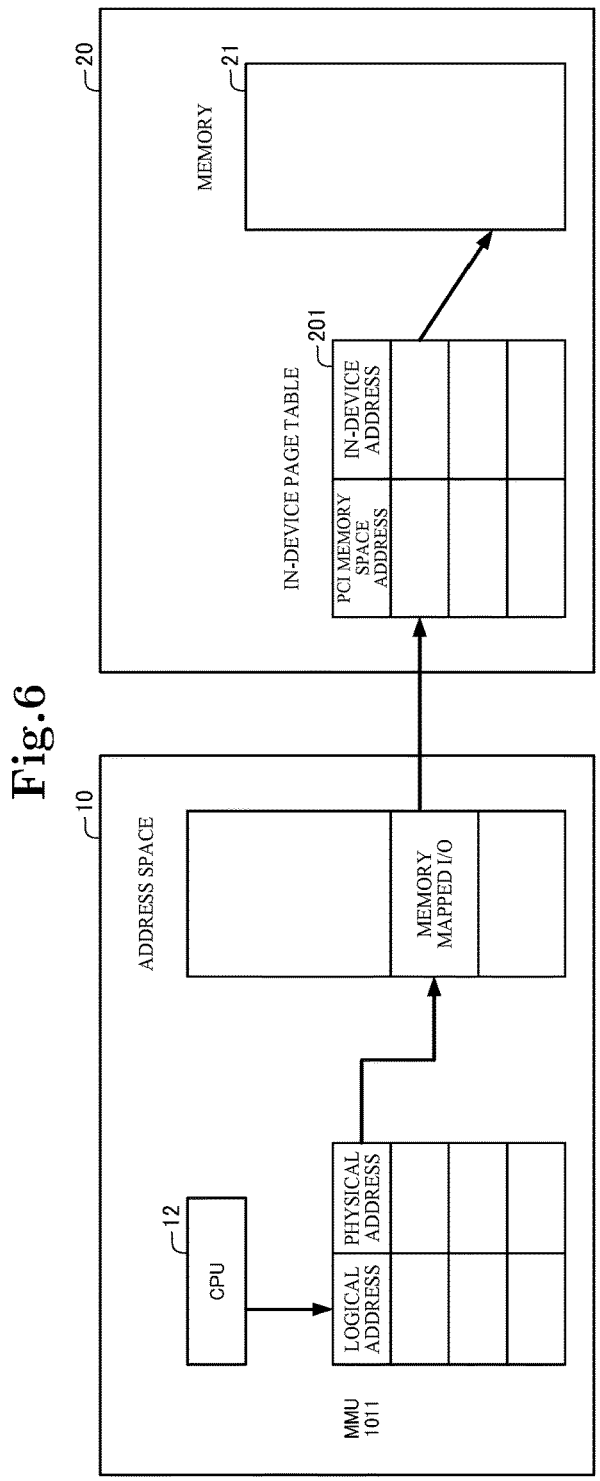
FIG. 6 is a diagram showing an example of how to access a memory of the calculation node from a CPU of the control node.
Figure 7:
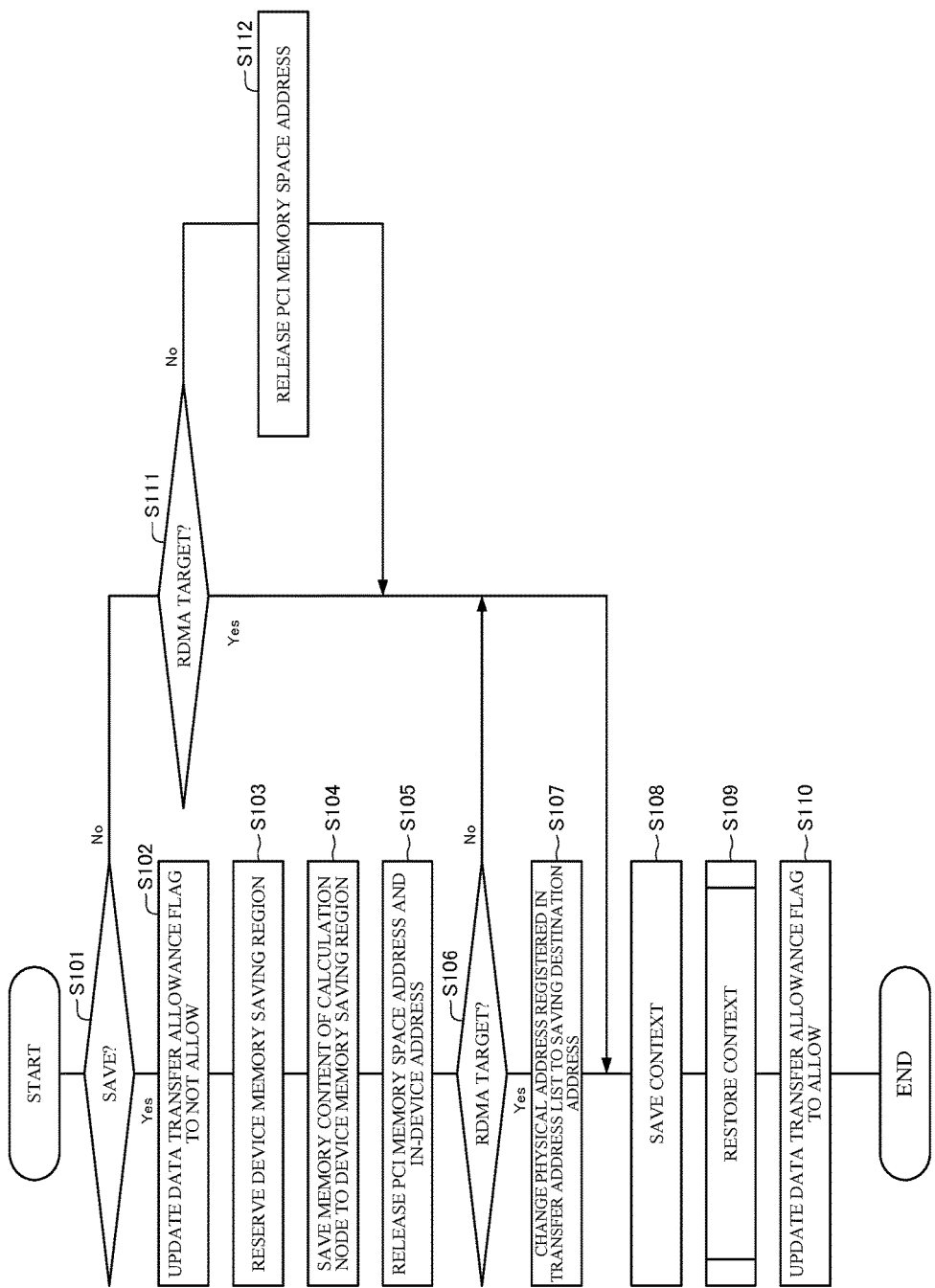
FIG. 7 is a flowchart showing an example of processing when the parallel computer performs a context switch.
Figure 8:
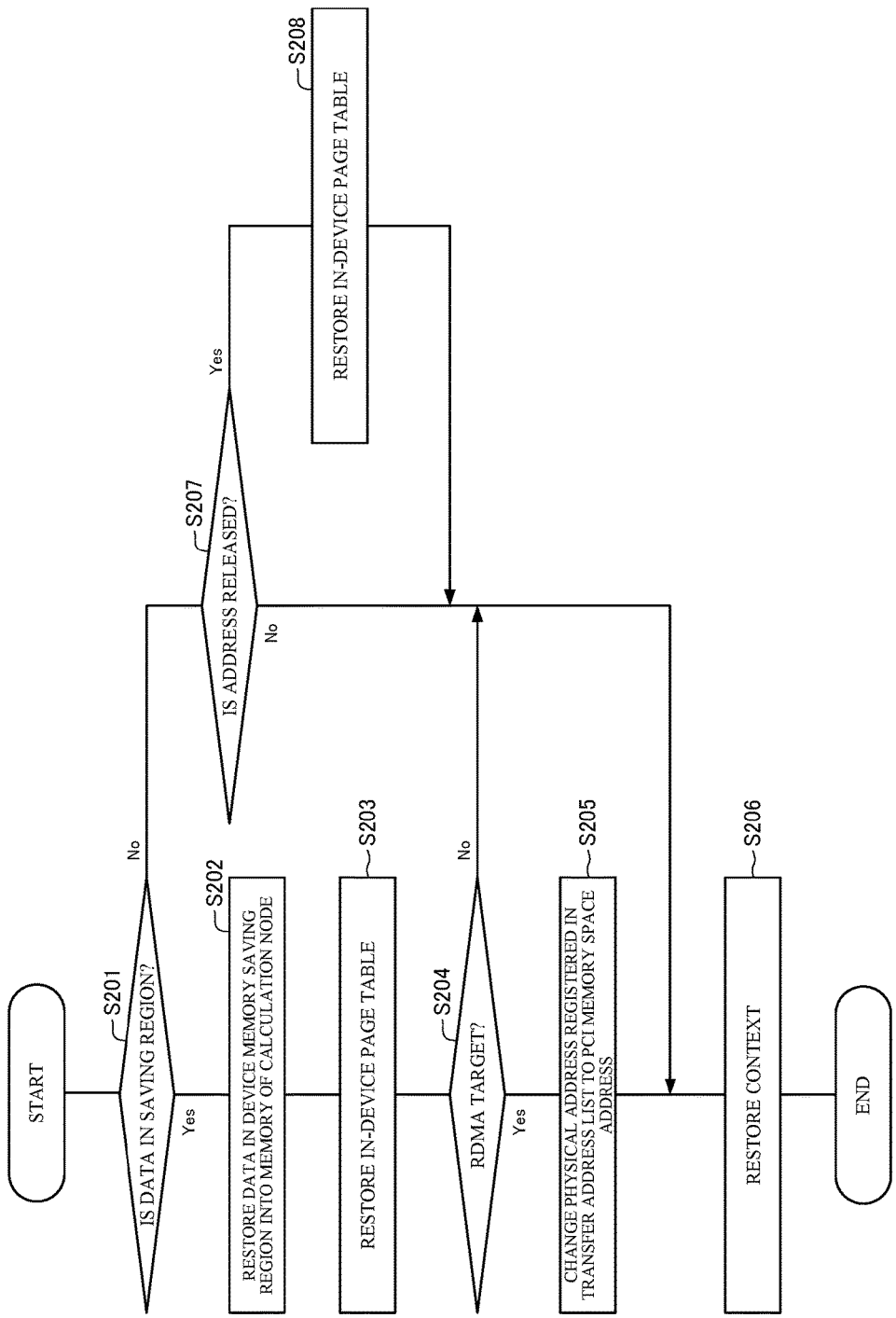
FIG. 8 is a flowchart showing a detailed example of processing at step S109 shown in FIG. 7.
Figure 9:
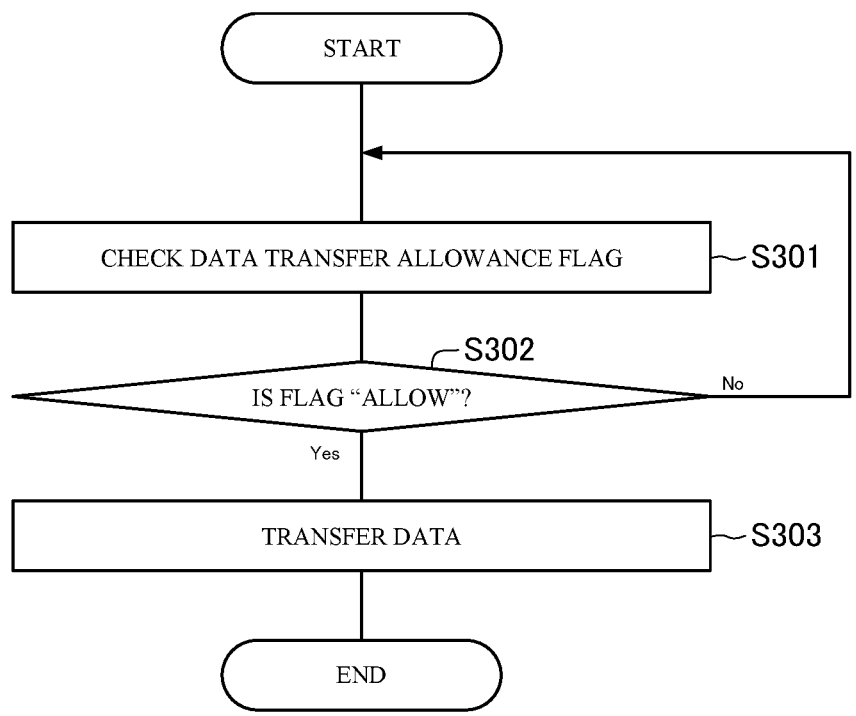
FIG. 9 is a flowchart showing an example of processing when an RDMA device performs data transfer.
Figure 10:
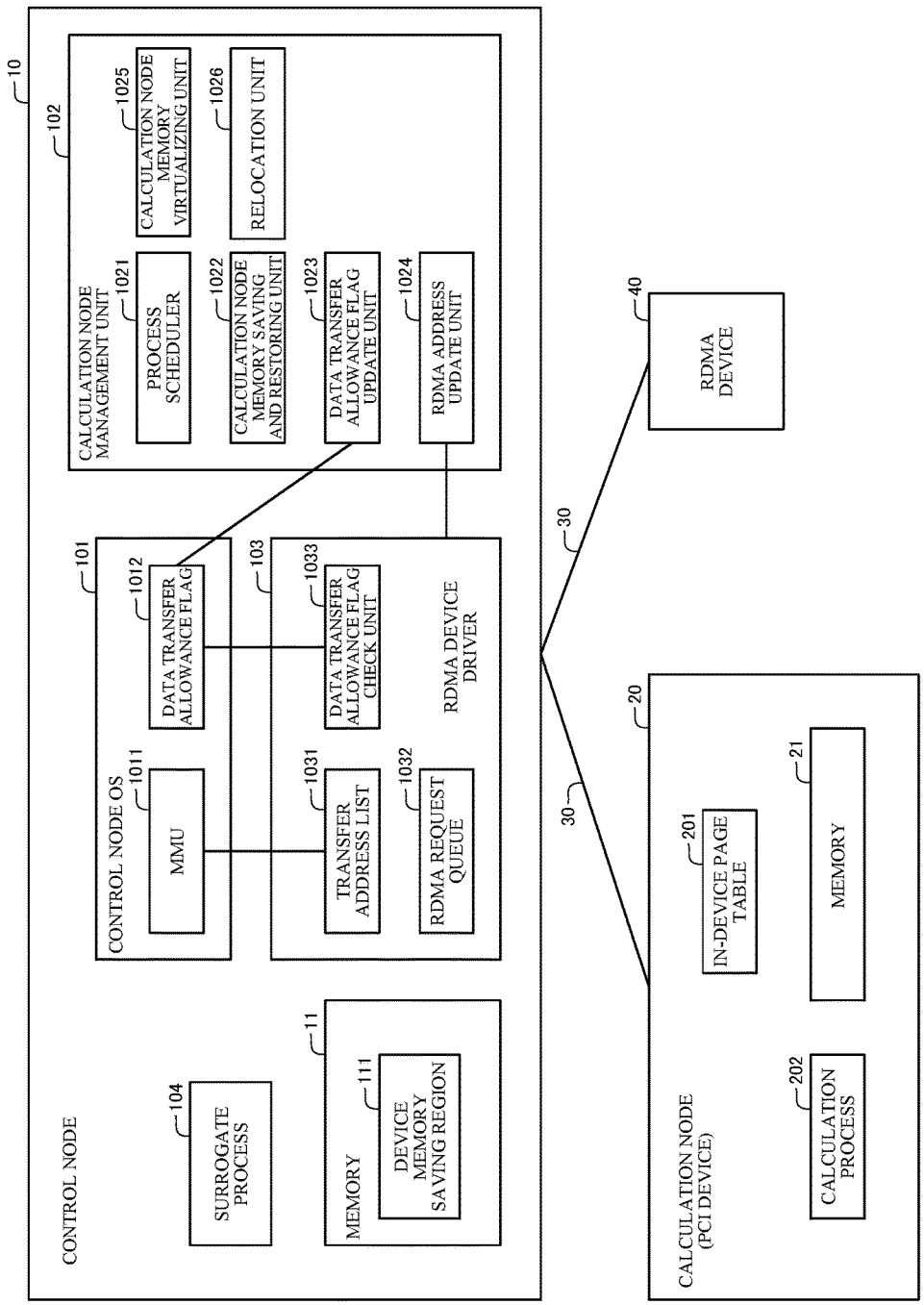
FIG. 10 is a block diagram showing an example of another configuration of the parallel computer.

A first exemplary embodiment of the present invention will be described with reference to FIGS. 1 to 10. FIG. 1 is a block diagram showing an example of a configuration of a parallel computer 1. FIG. 2 is a block diagram showing an example of a configuration of a calculation core 24. FIG. 3 is a block diagram showing an example of a configuration of a control node 10 and a calculation node 20 included by the parallel computer 1. FIG. 4 is a block diagram showing an example of a configuration when the calculation node 20 executes a calculation process. FIG. 5 is a diagram showing an example of a configuration of an in-device page table 201. FIG. 6 is a diagram showing an example of how to access a memory 21 of the calculation node 20 from a CPU 12 of the control node 10. FIG. 7 is a flowchart showing an example of processing when the parallel computer 1 performs a context switch. FIG. 8 is a flowchart showing a detailed example of processing at step S109 shown in FIG. 7. FIG. 9 is a flowchart showing an example of processing when an RDMA device 40 performs data transfer. FIG. 10 is a block diagram showing an example of another configuration of the parallel computer 1.

The parallel computer 1 to be described in this exemplary embodiment has the control node 10 with an OS incorporated, and the calculation node 20 that executes a calculation process 202 under control of the control node 10. As will be described later, at the time of loading calculation data 210 used by the calculation process 202 into the memory 21, the control node 10 creates the in-device page table 201 in which a PCI memory space address is associated with an in-device address that is a physical address in the memory 21. By thus creating the in-device page table 201, the control node 10 virtualizes the memory 21 included by the calculation node 20. Thus, the control node 10 can utilize the memory 21 without being limited to the size of a PCI memory space.

Further, at the time of performing a context switch to change the calculation process 202 executed by the calculation node 20, the control node 10 saves the calculation data 210 having been loaded in the memory 21 for execution of the calculation process 202 to the control node 10 as necessary. At this time, the control node 10 prohibits data transfer by the RDMA device and, as necessary, updates a transfer address list 1031. Consequently, it is possible to efficiently utilize the memory 21 of the calculation node 20 while guaranteeing data transfer by the RDMA device 40.

With reference to FIG. 1, the parallel computer 1 in this exemplary embodiment has the control node 10 (a control apparatus), the calculation node 20 that is a PCI device executing the calculation process 202, and the RDMA device 40 (a transfer device) performing data transfer between memories not via a processor. The control node 10 and the calculation node 20 are connected so as to be able to communicate with each other via an internode communication unit 30 (for example, PCI Express). Moreover, the control node 10 and the RDMA device 40 are connected so as to be able to communicate with each other via the internode communication unit 30.

Herein, the parallel computer 1 in this exemplary embodiment can be used as, for example, a parallel computer for HPC (High Performance Computing). The parallel computer 1 in this exemplary embodiment can also be applied to, for example, a parallel computer disclosed in Japanese Unexamined Patent Application Publication No. 2015-094974.

Further, in this exemplary embodiment, a case where the parallel computer 1 includes two nodes, which are the control node 10 and the calculation node 20, will be described. However, the configuration of the parallel computer 1 is not limited to the case illustrated in this exemplary embodiment. For example, the parallel computer 1 may include three or more nodes; for example, include one control node 10 and two calculation nodes 20. Moreover, in the case described in this exemplary embodiment, the control node 10 and the calculation node 20 have the same computer architectures. However, the control node 10 and the calculation node 20 may employ different computer architectures.

As shown in FIG. 1, the control node 10 has, for example, a memory 11 (a storage device), a CPU 12 (central processing unit), and a data transfer unit 13. Moreover, the CPU 12 has m processor cores 14 (m denotes a positive integer that is equal to or more than 1). The memory 11, the CPU 12, and the data transfer unit 13 are connected in the node by the PCI Express or the like. The processor cores 14 can access the memory 11 and the data transfer unit 13 in its own node (the control node 10) through the PCI Express or the like. Moreover, the calculation node 20 has the same configuration as the control node 10. That is, the calculation node 20 has a memory 21, a CPU 22, and a data transfer unit 23. Moreover, the CPU 22 has a plurality of processor cores 24.

The parallel computer 1 in this exemplary embodiment is a NUMA (Non-Uniformed Memory Access) type information processing apparatus. When one of the nodes accesses the memory of the other node (for example, the control node 10 accesses the memory 21 of the calculation node 20), the internode communication unit 30 is used.

The memory 11 is a semiconductor memory that stores data and a program to be executed. The memory 11 is shared by the processor cores 14 in the control node 10. The configuration of the memory 21 is the same as that of the memory 11. That is, the memory 21 is shared by the processor cores 24 in the calculation node 20.

The data transfer unit 13 has a DMA (Direct Memory Access) engine 15 that accesses the memory 11 not via the CPU 12, and a to-CPU communication function 16 that accesses resources such as a register on the CPU 12. Meanwhile, the to-CPU communication function 16 may be configured to map the resources such as a register on the CPU 12 to a memory space and make the DMA engine 15 access. The configuration of the data transfer unit 23 is the same as the configuration of the data transfer unit 13.

The internode communication unit 30 can be realized by an interconnect having a DMA function or an RDMA (Remote Direct Memory Access) function such as the PCI Express or the InfiniBand.

The control node 10 and the calculation node 20 have the configurations as described above. As will be described later, in this exemplary embodiment, the control node 10 has an operation system (OS) function, whereas the calculation node 20 does not have an operating system function. Moreover, the calculation node 20 executes the calculation process 202 under control of the control node 10. Hereinafter, the processor cores 24 on the calculation node 20 will be referred to as the calculation cores 24.

Now, the details of the configuration of the calculation core 24 will be described. With reference to FIG. 2, the calculation core 24 has, for example, general-purpose registers 240, control registers 241, an exception detection unit 242, a registers access unit 243, and an exception notification unit 244.

In the same manner as in a general processor such as x86 and ARM, the general-purpose registers 240 include a program counter (PC), a general-purpose register (GPR) for storing an arithmetic result, and so on. The registers are rewritten in accordance with execution of an instruction in the calculation core 24. Moreover, the calculation core 24 executes a load instruction or a store instruction, whereby data transfer between the general-purpose registers 240 and the memory 21.

The control registers 241 are registers for controlling execution of the calculation core 24. The control node 10 instructs the control registers 241 of the calculation node 20 to start and suspend execution of an instruction through the internode communication unit 30 and the data transfer units 13 and 23. When the control node 10 instructs the calculation core 24 to start execution, the calculation core 24 starts processing in accordance with the content of the general-purpose registers 240. To be specific, the calculation core 24 fetches an instruction in accordance with the value of the program counter, executes the fetched instruction, and updates the content of the registers 240 and the memory 21. This state will be referred to as an instruction executing state. On the other hand, when the control node 10 instructs the calculation core 24 to suspend execution, the calculation core 24 suspends execution of a new instruction. A state where suspension of execution has been instructed and there is no instruction in process on the calculation core 24 will be referred to as an instruction execution suspending state. Once transitioning to the instruction execution suspending state, the calculation core 24 does not execute a new instruction until instructed by the control node 10 to start execution. Whether the calculation core 24 is in the instruction executing state or in the instruction execution suspending state can be referred to by the control node 10 through the internode communication unit 30, the data transfer unit 13 and the registers access unit 243. In case there is no function to refer to, it is possible to configure to notify the control node 10 whether the calculation node 24 is in the instruction executing state or in the instruction execution suspending state by sending exception information.

The exception detection unit 242, upon detecting any exception during execution of an instruction, instructs the control registers 241 to suspend the execution. Simultaneously, the exception detection unit 242 asks the exception notification unit 244 to notify exception (transmit exception occurrence information). The abovementioned exception refers to an operation exception such as zero division exception, a memory access system exception such as memory access boundary violation, an exception occurring in a general processor such as software trap for system call.

The exception notification unit 244 notifies suspension of execution of the calculation core 24 to the control node 10 by using the internode communication unit 30 on the basis of the exception occurrence information acquired from the exception detection unit 242. The exception notification unit 244 can be implemented by any method as far as it can notify occurrence of an exception to the control node 10. For example, it can be realized by the following method; (A) an interruption function owned by the internode communication unit 30 such as MSI/MSI-X of PCI Express, and (B) DMA writing to a previously reserved memory region. In the case of the method (B), a calculation node management unit 102 to be described later needs to monitor, on the control node 10, the presence or absence of exception notification from the calculation node 20 by a method such as polling. Besides, the exception notification unit 244 can also inhibit notification of exception occurrence to the control node 10 by setting from the control node 10. In this case, it is possible to configure so that the control node 10 detects occurrence of an exception by, for example, the following method; (C) the control node 10 directly monitors the execution status of the control registers 241 (polling).

The registers access unit 243 reads from and writes into the respective registers of the general-purpose registers 240 and the control registers 241 on the basis of an instruction issued by the control node 10. However, reading from and writing into the general-purpose registers 240 is allowed to be issued to only the calculation core 24 in the instruction execution suspending state. The operation of the calculation core 24 when there is access to the general-purpose registers 240 of the calculation core 24 in the instruction executing state is indeterminate (for example, this access is ignored).

The above is an example of the configuration of the calculation core 24. When the parallel computer 1 in this exemplary embodiment performs a context switch, it changes the contexts (register values) of the general-purpose registers 240 of the calculation core 24. The parallel computer 1 can efficiently utilize the memory 21 when performing such a context switch as will be described later. FIG. 3 shows an example of a configuration for efficiently utilizing the memory 21 included by the calculation node 20 in the parallel computer 1 in this exemplary embodiment. Below, the calculation node 20 and the control node 10 will be described in more detail.

<Calculation Node 20>

With reference to FIG. 3, on the calculation node 20, a single calculation process 202 or a plurality of calculation processes 202 are loaded under control of the control node 10. Herein, the calculation process 202 is a process loaded on the calculation node 20 (can be any execution unit). The calculation process 202 is generated along with, for example, start of an application program that runs on the calculation node 20 and terminated along with end of execution thereof.

To be specific, for example, as shown in FIG. 4, the calculation data 210 (calculation data 210-1, 210-2 . . . 210-n: will be expressed as the calculation data 210 when not particularly distinguished from the others) used at the time of execution of the calculation process 202 and so on is stored in the memory 21 of the calculation node 20. Moreover, the context of a single calculation process 202 is stored in each of the calculation cores 24. Each of the calculation cores 24 executes processing of the calculation process 202 by using the calculation data 210 on the memory 21 associated with the context stored therein.

Further, the calculation node 20 has the in-device page table 201 created by a calculation node memory virtualizing unit 1025 of the control node 10. The in-device page table 201 is used to convert an access to a memory mapped I/O address to an in-device physical address inside the calculation node 20. The in-device page table 201 is created by the calculation node memory virtualizing unit 1025, for example, when the calculation node management unit 102 loads the calculation data 210 to the memory 21.

FIG. 5 shows an example of a configuration of the in-device page table 201. With reference to FIG. 5, in the in-device page table 201, for example, a PCI memory space address recognized by the CPU 12 of the control node 10 is associated with an in-device address that is a physical address in the memory 21. For example, in the first row of FIG. 5, a PCI memory space address "0" is associated with an in-device address "0x5000".

By thus creating the in-device page table 201, for example, it is possible to change an in-device address associated with a PCI memory space address. Consequently, the size of a memory that can be used by the control node 10 is hard to be limited by the size of a PCI memory space. Herein, the in-device page table 201 includes, for example, a page table entry corresponding to each page of the memory 21. Moreover, the in-device page table 201 can include information showing a use condition and an attribute.

The above is an example of a configuration of the calculation node 20. Access to the memory 21 by the calculation core 24 in the calculation node 20 may be performed with the use of a page table (not shown in the drawings) specifically for the calculation core 24, or may be performed with the use of the in-device page table 201.

<Control Node 10>

The control node 10 employs the same configuration as a normal stand-alone type computer system that employs an operating system, and provides a service of an operating system function for the calculation node 20. In this specification, an operating system installed in the control node 10 is referred to as a control node OS 101. The control node OS 101 has, for example, a general function as an operating system. The control node OS 101 may be a commodity operating system used for a computer typified by Linux®, Windows and the like.

With reference to FIG. 3, the control node 10 has functions as the control node OS 101, the calculation node management unit 102 (an external apparatus control unit), an RDMA device driver 103 (a transfer unit) that manages the RDMA device 40, and a surrogate process 104. The respective components (functions) mentioned above are realized by, for example, execution of a program stored in a storage device (not shown in the drawings) by the CPU 12.

The control node OS 101 has an MMU (Memory Management Unit) 1011 (a memory access unit) that manages the memory of the control node 10, and a data transfer allowance flag 1012 (a data transfer prohibition unit). Meanwhile, the data transfer allowance flag 1012 may be included by, for example, the RDMA device driver 103.

The MMU 1011 has, for example, a table in which a logical address is associated with a physical address, which is not shown in the drawings. By referring to the table that is not shown in the drawings, the MMU 1011 execute a process of converting a logical address used by the CPU 12 to a physical address. The parallel computer 1 in this exemplary embodiment uses a mechanism of memory mapped I/O, and a region for input and output is provided to part of a physical address space.

The data transfer allowance flag 1012 shows whether or not to allow transfer of data by the RDMA device 40. As will be described later, when the data transfer allowance flag 1012 shows "allow", the RDMA device 40 can execute data transfer. On the other hand, when the data transfer allowance flag 1012 shows "not allow", the RDMA device 40 waits until the data transfer allowance flag 1012 shows "allow".

The data transfer allowance flag 1012 is updated by a data transfer allowance flag update unit 1023 to be described later. The data transfer allowance flag 1012 may show whether or not to uniformly allow all data transfer or, for example, may show whether or not to allow data transfer for each calculation process 202, each memory 21 or each page. In other words, the data transfer allowance flag 1012 may show "allow" or "not allow" for example, for each calculation process 202, each memory 21 or each page.

The RDMA device driver 103 controls the RDMA device 40. The RDMA device driver 103 holds, for each calculation process 202, a transfer address list 1031 and an RDMA request queue 1032. Moreover, the RDMA device driver 103 has a data transfer allowance flag check unit 1033.

In the transfer address list 1031, a logical address used in the calculation process 202 is associated with a physical address. A physical address in the transfer address list 1031 shows, for example, a PCI memory space address. Moreover, as will be described later, a physical address in the transfer address list 1031 may be updated from a PCI memory space address to the address of a saving destination (that is, the address of a device memory saving region 111) by the RDMA address update unit 1024. Thus, a physical address in the transfer address list 1031 is updated depending on whether or not the calculation data 210 is being saved in the memory 11.

The RDMA request queue 1032 accepts a data transfer request from the CPU 12, the surrogate process 104 and so on, and keeps it. A data transfer request includes, for example, information showing the logical address of a data transfer source, the logical address of a data transfer destination, and so on.

The data transfer allowance flag check unit 1033 checks the data transfer allowance flag 1012 at the time of causing the RDMA device 40 to execute data transfer. In a case where the data transfer allowance flag 1012 shows "allows", the data transfer allowance flag check unit 1033 allows data transfer. On the other hand, in a case where the data transfer allowance flag 1012 shows "not allow", the data transfer allowance flag check unit 1033 does not allow data transfer.

The calculation node management unit 102 performs necessary preparation for execution of the calculation process 202 on the calculation node 20, and also performs general memory management on the calculation node 20. For example, in the case of causing the calculation node 20 to execute the calculation process 202, the calculation node management unit 102 stores a context into the calculation core 24, and also loads the calculation data 210 associated with the calculation process 202 to be executed to the memory 21. Moreover, at the time of loading the calculation data 210 to the memory 21, the calculation node management unit 102 instructs the calculation node memory virtualizing unit 1025 to create the in-device page table 201. Consequently, the calculation node memory virtualizing unit 1025 creates the in-device page table 201.

With reference to FIG. 3, the calculation node management unit 102 has a process scheduler 1021, a calculation node memory saving and restoring unit 1022 (a saving unit), the data transfer allowance flag update unit 1023, the RDMA address update unit 1024 (an address update unit), and the calculation node memory virtualizing unit 1025 (an external memory virtualizing unit).

The process scheduler 1021 manages the calculation process 202 to be executed on the calculation node 20.

For example, the process scheduler 1021 determines to perform a context switch to change the calculation process 202 being executed by the calculation core 24, for example, because system call is executed or time slice is used up.

Further, at the time of performing a context switch, the process scheduler 1021 determines whether or not to save the calculation data 210 for the calculation process 202 before change to the memory 11 of the control node 10 in accordance with a previously determined management policy.

For example, the process scheduler 1021 determines to save the calculation data 210 for the calculation process 202 before change every time a context switch occurs. Otherwise, the process scheduler 1021 determines to save the calculation data 210 for the calculation process 202 before change every time an arbitrary number of context switches occur. Thus, the process scheduler 1021 can be configured to determine whether or not to save the calculation data 210 depending on the number of context switch occurrences. Meanwhile, the process scheduler 1021 may determine whether or not save the calculation data 210 for the calculation process 202 before change depending on the free space of the memory 21. For example, the process scheduler 1021 can determine to save the calculation data 210 having been used in the calculation process 202 before change in a case where the free space of the memory 21 after the calculation data 210 corresponding to a new calculation process 202 is loaded to the memory 21 is equal to or less than a predetermined threshold value. Moreover, the process scheduler 1021 may be configured to determine whether or not to save the calculation data 210 depending on whether the calculation data 210 is the target of data transfer by the RDMA device 40. Thus, the process scheduler 1021 determines whether or not to save the calculation data 210 to the memory 11 in accordance with a previously determined management policy. Meanwhile, the process scheduler 1021 may determine whether or not to save the calculation data 210 on the basis of a combination of some of the above conditions, or may determine whether or not to save the calculation data 210 on the basis of a management policy other than illustrated above.

Furthermore, at the time of saving the calculation data 210 to the memory 11 of the control node 10, the process scheduler 1021 instructs the data transfer allowance flag update unit 1023 to update the data transfer allowance flag 1012 to "not allow". Moreover, in the case of determining that the calculation data 210 to be saved is an RDMA target as a result of checking the transfer address list 1031 or the like, the process scheduler 1021 instructs the RDMA address update unit 1024 to update the transfer address list 1031.

Thus, the process scheduler 1021 performs overall management on the calculation process 202.

The calculation node memory saving and restoring unit 1022 saves the calculation data 210 having been loaded to the memory 21 into the device memory saving region 111 reserved in the memory 11 in response to an instruction by the process scheduler 1021. Moreover, the calculation node memory saving and restoring unit 1022 restores the calculation data 210 having been saved in the device memory saving region 111 to the memory 21 in response to an instruction by the process scheduler 1021.

For example, upon receiving an instruction to save the calculation data 210 from the process scheduler 1021, the calculation node memory saving and restoring unit 1022 reserves the device memory saving region in the memory 11. Then, the calculation node memory saving and restoring unit 1022 saves the target calculation data 210 into the reserved device memory saving region 111. The calculation node memory saving and restoring unit 1022 can be configured to manage, as management information, necessary information for restoring the saved calculation data 210, such as information showing a PCI memory space address before saving and information showing the calculation process 202 associated with the calculation data 210 having been saved.

The data transfer allowance flag update unit 1023 updates the data transfer allowance flag 1012 in response to an instruction by the process scheduler 1021. In other words, the data transfer allowance flag update unit 1023 updates the data transfer allowance flag 1012 either to "allow" or "not allow" in response to an instruction by the process scheduler 1021.

The RDMA address update unit 1024 changes a physical address in the transfer address list 1031 in response to an instruction by the process scheduler 1021.

For example, at the time of saving the calculation data 210 into the memory 11, the RDMA address update unit 1024 changes a target physical address in the transfer address list 1031 from a PCI memory space address to the address of the saving destination. Moreover, at the time of restoring the calculation data 210 saved in the memory 11 to the memory 21, the RDMA address update unit 1024 changes a target physical address in the transfer address list 1023 from the address of the saving destination to a PCI memory space address.

The calculation node memory virtualizing unit 1025 creates and manages the in-device page table 201.

For example, when the calculation node management unit 102 loads the calculation data 210 onto the memory 21, the calculation node memory virtualizing unit 1025 creates the in-device page table 201 in response to an instruction by the calculation node management unit 102.

Further, after the calculation node memory saving and restoring unit 1022 saves the calculation data 210, the calculation node memory virtualizing unit 1025 releases a PCI memory space address and an in-device address associated with the saved calculation data 210 in the in-device page table 201. Besides, for example, at the time of performing a context switch, in a case where the calculation data 210 is not saved and the calculation data 210 that is not saved is not the target of transfer by the RDMA device 40, the calculation node memory virtualizing unit 1025 can release only a PCI memory space address. In other words, at the time of performing a context switch, in a case where the target calculation data 210 is not the target of transfer by the RDMA device 40, the calculation node memory virtualizing unit 1025 can release a PCI memory space address and an in-device address at the time saving the calculation data 210 and release a PCI memory space address at the time of not saving the calculation data 210. That is, at the time of performing a context switch, in a case where the target calculation data 210 is not the target of transfer by the RDMA device 40, the calculation node memory virtualizing unit 1025 releases at least a PCI memory space address.

Further, after the calculation node memory saving and restoring unit 1022 restores the calculation data 210, the calculation node memory virtualizing unit 1025 restores the in-device page table 201 with reference to management information or the like. An in-device address may be any place, but the calculation node memory virtualizing unit 1025 restores the in-device page table 201 so that association between data to be stored and a PCI memory space address is the same as before saving. By thus restoring the in-device page table 201, the need for updating the MMU 1011 is eliminated.

The surrogate process 104 assists execution of the calculation process 202 operating on the calculation node 20. The surrogate process 104 is generated so as to be associated with the calculation process 202. For example, the surrogate process 104 executes system call processing in place of an OS that should be present on the calculation node 20 in response to a request by the calculation process 202. Moreover, the surrogate process 104 is also used when the calculation process 202 uses the RDMA device 40. In other words, the calculation process 202 instructs the surrogate process 104 to perform data transfer using the RDMA device 40.

The above is an example of a more detailed configuration of the control node 10 and the calculation node 20.

The RDMA device 40 executes processing such as data transfer in response to an instruction by the RDMA device driver 103. That is, the RDMA device 40 executes processing to directly transfer data from a memory in which data is stored to another memory in response to an instruction by the RDMA device driver 103. Because the configuration of the RDMA device 40 is the same as a well-known one, a detailed description thereof will be omitted.

The above is an example of the configuration of the parallel computer 1. Now, FIG. 6 shows an example of how the CPU 12 of the control node 10 accesses the memory 21 of the calculation node 20 in a case where the memory 21 is virtualized. With reference to FIG. 6, it is found that the CPU 12 accesses a PCI memory space, thereby accessing the memory 21 of the calculation node 20. In this case, the calculation node 20 has the in-device page table 201 in which a PCI memory space address is associated with an in-device page address. By virtualizing the memory 21 with the use of the in-device page table 201, the CPU 12 can utilize the memory 21 without being limited to the size of the PCI memory space.

Subsequently, with reference to FIGS. 7 to 9, an example of operation of the parallel computer 1 will be described. First, with reference to FIG. 7, an example of an overall flow at the time of performing a context switch will be described.

With reference to FIG. 7, the process scheduler 1021 determines to perform a context switch to change the calculation process 202 being executed in the calculation core 24, for example, because system call is executed or time slice is used up. Then, the process scheduler 1021 determines whether or not to save the calculation data 210 for the calculation process 202 before changed by the context switch to the memory 11 of the control node 10 in accordance with a predetermined management policy (step S101).

In the case of saving the calculation data 210 to the memory 11 (step S101, Yes), the process scheduler 1021 instructs the data transfer allowance flag update unit 1023 to update the data transfer allowance flag 1012 to "not allow". Consequently, the data transfer allowance flag update unit 1023 updates the data transfer allowance flag 1012 to "not allow" (step S102). Moreover, the process scheduler 1021 instructs the calculation node memory saving and restoring unit 1022 to save the calculation data 210. Then, the calculation node memory saving and restoring unit 1022 reserves the device memory saving region 111 in the memory 11 in response to the instruction by the process scheduler 1021 (step S103). Then, the calculation node memory saving and restoring unit 1022 saves the target calculation data 210 to the reserved device memory saving region 111 (step S104). After the calculation node memory saving and restoring unit 1022 saves the calculation data 210, the calculation node memory virtualizing unit 1025 releases a PCI memory space address and an in-device address associated with the saved calculation data 210 in the in-device page table 201 (step S105).

Further, the process scheduler 1021 checks the transfer address list 1031 and the like, and checks whether or not the saved calculation data 210 is an RDMA target (step S106). In a case where the calculation data 210 is an RDMA target (step S106, Yes), the process scheduler 1021 instructs the RDMA address update unit 1024 to update the transfer address list 1031. In response to the instruction, the RDMA address update unit 1024 updates a corresponding physical address in the transfer address list from a PCI memory space address to the address of the saving destination (that is, the address of the device memory saving region 111) (step S107).

After the processing at step S107, the calculation node management unit 102 withdraws the context from the general-purpose registers 240 of the calculation core 24 (step S108). The calculation node management unit 102 manages the withdrawn context in a calculation processing DB (database) or the like, which is not show in the drawings. Moreover, the calculation node management unit 102 stores a context associated with a new calculation process 202 into the general-purpose registers 240 (step S109). The details of the processing at step 109 will be described with reference to FIG. 8.

After the processing at step S109, the process scheduler 1021 instructs the data transfer allowance flag update unit 1023 to update the data transfer allowance flag 1012 to "allow". Consequently, the data transfer allowance flag update unit 1023 updates the data transfer allowance flag 1012 to "allow" (step S110). Meanwhile, in a case where the data transfer allowance flag 1012 is already "allow", the data transfer allowance flag update unit 1023 does not need to do anything.

On the other hand, in the case of determining not to save the calculation data 210 to the memory 11 in the processing at step S101 (step S101, No), the process scheduler 1021 checks the transfer address list 1031 and so on, and checks whether or not the calculation data 210 not to be saved is a RDMA target (step S111). Then, in a case where the calculation data 210 not to be saved is not an RDMA target (step S111, No), the process scheduler 1021 releases only a PCI memory space address associated with the calculation data 210 that is not to be saved in the in-device page table 201 with the use of the calculation node memory virtualizing unit 1025 (step S112). After the processing at step S112, or when the calculation data 210 not to be saved is an RDMA target (step S111, Yes), the operation proceeds to the processing at step S108.

The above is an example of an overall flow at the time of performing a context switch. Subsequently, with reference to FIG. 8, the details of the processing at step S109 of FIG. 7 will be described.

With reference to FIG. 8, the process scheduler 1021 checks whether or not the calculation data 210 used by the calculation process 202 after changed by the context switch is saved in the device memory saving region 111 (step S201). The checking at step S201 can be done by, for example, checking the transfer address list 1031 or checking the management information or the like.

In a case where the calculation data 210 is saved in the device memory saving region 111 (step S201, Yes), the process scheduler 1021 instructs the calculation node memory saving and restoring unit 1022 to restore the target calculation data 210. Consequently, the calculation node memory saving and restoring unit 1022 restores the target calculation data 210 into the memory 21 (step S202). After that, the in-device page table 201 is restored by the calculation node memory virtualizing unit 1025 (step S203). In this case, an in-device address may be any place, but the calculation node memory virtualizing unit 1025 restores the in-device page table 201 so that association of stored data with a PCI memory space address is the same as before saving.

Further, the process scheduler 1021 checks the transfer address list 1031 and the like, and checks whether or not the restored calculation data 210 is an RDMA target (step S204). In a case where the calculation data 210 is an RDMA target (step S204, Yes), the process scheduler 1021 instructs the RDMA address update unit 1024 to update the transfer address list 1031. In response to the instruction, the RDMA address update unit 1024 updates a corresponding physical address in the transfer address list 1031 from the address of the saving destination to a PCI memory space address (step S205).

After that, the calculation node management unit 102 stores a context into the general-purpose registers 240 of the calculation core 24 (step S206).

On the other hand, in a case where the calculation data 210 is not saved in the device memory saving region 111 (step S201, No), the process scheduler 1021 refers to the in-device page table 201 and checks whether or not a PCI memory space address is released (step S207). In a case where a PCI memory space address is released (step S207, Yes), the process scheduler 1021 restores a corresponding PCI memory space address in the in-device page table 201 with the use of the calculation node memory virtualizing unit 1025 (step S208). After the processing at step S208, or when a PCI memory space address is not released (step S207), the operation proceeds to the processing at step S206.

The above is an example of the details of the processing at step S109 of FIG. 7. Next, with reference to FIG. 9, an example of processing when the RDMA device 40 performs data transfer.

With reference to FIG. 9, the RDMA device driver 103 extracts requests registered in the RDMA request queue 1032 one by one. Then, the RDMA device driver 103 refers to the transfer address list 1031 and converts a logical address to a physical address.

The data transfer allowance flag check unit 1033 of the RDMA device driver 103 checks the data transfer allowance flag 1012. In a case where the data transfer allowance flag 1012 is "allow" (step S302, Yes), the data transfer allowance flag check unit 1033 allows data transfer. Consequently, the RDMA device 40 executes data transfer (step S303).

On the other hand, in a case where the data transfer allowance flag 1021 is "not allow" (step S302, No), the data transfer allowance flag check unit 1033 checks the data transfer allowance flag 1012 again, for example, at predetermined times (may be any time) (step S301). Thus, when the data transfer allowance flag 1012 is "now allow", the data transfer allowance flag check unit 1033 does not allow data transfer, whereby the RDMA device 40 executes data transfer only when the data transfer allowance flag 1012 is "allow".

The above is an example of the processing when the RDMA device 40 performs data transfer.

Thus, the control node 10 in this exemplary embodiment has the calculation node memory virtualizing unit 1025. With such a configuration, the calculation node memory virtualizing unit 1025 creates the in-device page table 201 in which a PCI memory space address is associated with an in-device address that is a physical address in the memory 21, whereby the memory 21 can be virtualized. Consequently, it is possible to utilize the memory 21 without being limited to the size of a PCI memory space. As a result, it is possible to efficiently utilize the memory 21 installed in the calculation node 20.

Further, the control node 10 has the calculation node memory saving and restoring unit 1022, the data transfer allowance flag update unit 1023, and the RDMA address update unit 1024. With such a configuration, when the calculation node memory saving and restoring unit 1022 saves the calculation data 210, the data transfer allowance flag update unit 1023 can prohibit data transfer by the RDMA device 40. Moreover, the RDMA address update unit 1024 can change a corresponding physical address in the transfer address list 1031 from a PCI memory space address to the address of a saving destination. Consequently, in a case where data is an RDMA target, it is possible to save the data to the control node 10 while guaranteeing data transfer by RDMA. As a result, it is possible to efficiently utilize the memory 21 installed in the calculation node 20.

When the calculation processes 202 are repeatedly executed, there is a possibility that many regions being used in the memory 21 are physically discontinuous. In such a state, for example, in a case where a physically continuous region is required, memory acquisition is likely to fail. According to this exemplary embodiment, because the memory 21 is virtualized, it is possible to use the PCI memory space address of the in-device page table 201 as it is even if divided in-device addresses are moved. Therefore, memory compaction and defragmentation on the memory 21 can be executed. In other words, the calculation node management unit 102 of the control node 10 can include a relocation unit 1026 that performs memory compaction and defragmentation (see FIG. 10).

Further, in general, a memory is accessed by a CPU on a fixed capacity basis, which is called a memory bank, and it is possible to parallelize memory access by locating data to be accessed simultaneously into other memory banks. According to the present invention, because the memory 21 is virtualized, it is possible to move the physical address of data to a position with better efficiency of access from the calculation core 24.

Further, a normal memory region is released with the termination of a reserved process, but a region of an RDMA target continues to be reserved until the RDMA device driver 103 can safely release the memory. On the other hand, according to the parallel computer 1 described in this exemplary embodiment, after the calculation process 202 that is the subject of memory operation ends, a need that the calculation data 210 is in the memory 21 decreases, so that it is possible to save the calculation data 210 to the device memory retraction region 111. Then, it is possible to release the calculation data 210 saved in the device memory save region 111 after RDMA transfer completely ends. In other words, the process scheduler 1021 can be configured to instruct the calculation node memory saving and restoring unit 1022 to, when the calculation process 202 ends, save the calculation data 210 into the memory 11. Consequently, the calculation node memory saving and restoring unit 1022 can save the calculation data 210 with the calculation process 202 ended into the reserved device memory saving region 111. Further, in this case, the process scheduler 1021 instructs the RDMA address update unit 1024 to update the transfer address list 1031. Consequently, the RDMA address update unit 1024 can update the transfer address list 1031. With such a configuration, the need for continuously reserving the memory 21 is eliminated at a point that the calculation process 202 ends. Consequently, it is possible to efficiently utilize the memory 21.

Second Exemplary Embodiment

Figure 11:
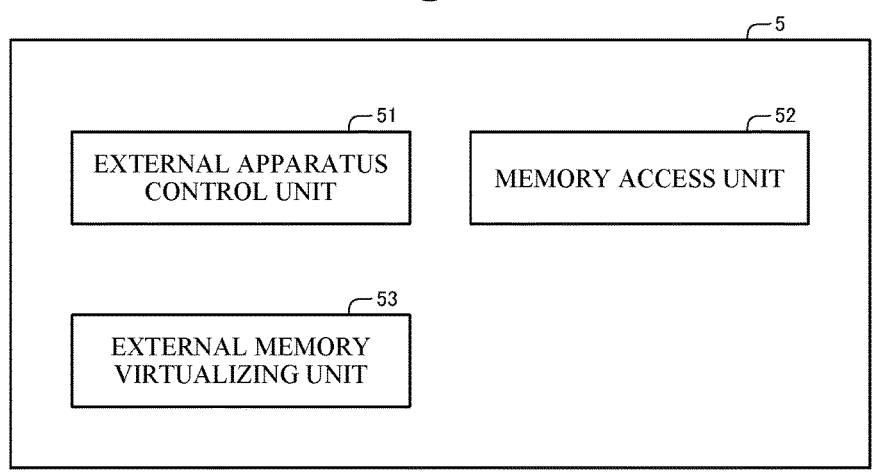
FIG. 11 is a block diagram showing an example of a configuration of a control apparatus in a second exemplary embodiment of the present invention.
Figure 12:
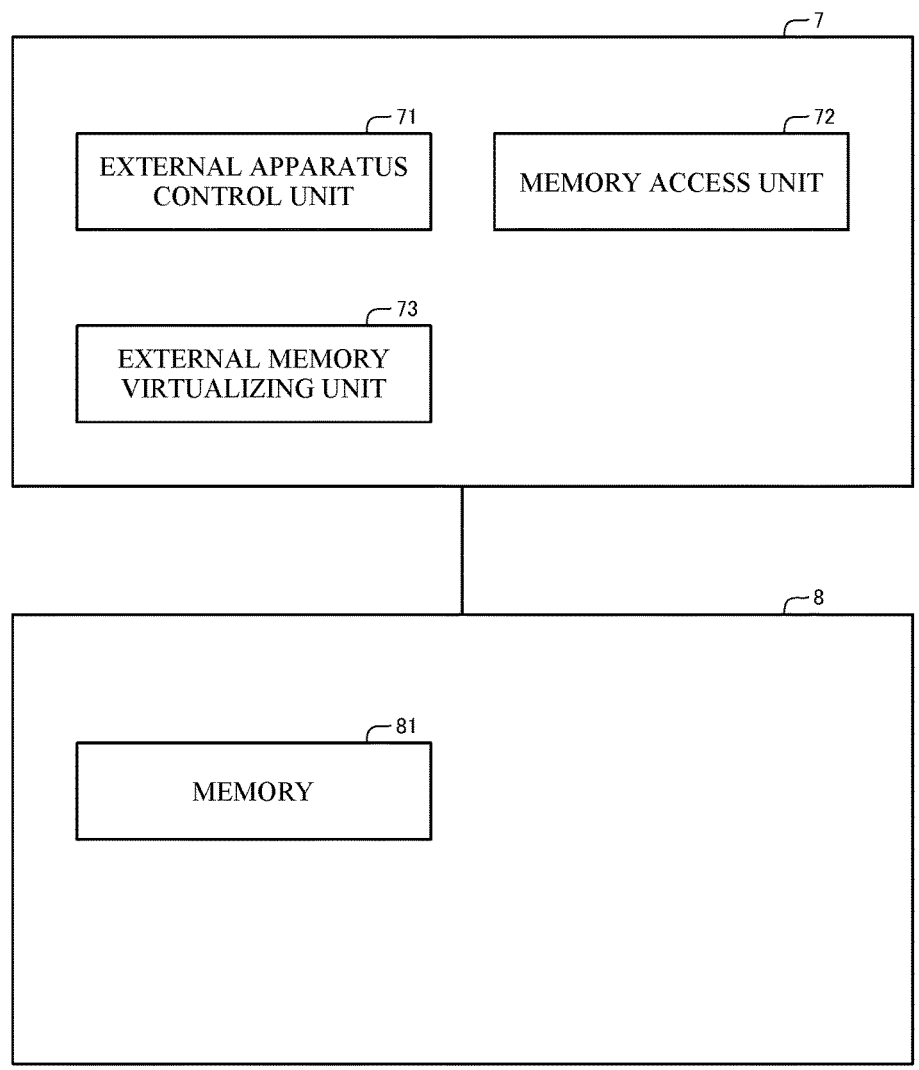
FIG. 12 is a block diagram showing an example of a configuration of an information processing apparatus in the second exemplary embodiment of the present invention.

Next, with reference to FIGS. 11 and 12, a second exemplary embodiment of the present invention will be described. FIG. 11 shows an example of a configuration of a control apparatus 5. FIG. 12 shows an example of a configuration of an information processing apparatus 6. In the second exemplary embodiment, the overview of the configurations of the control apparatus 5 and the information processing apparatus 6 will be described. First, the control apparatus 5 will be described with reference to FIG. 11.

With reference to FIG. 11, the control apparatus 5 has an external apparatus control unit 51, a memory access unit 52, and an external memory virtualizing unit 53. For example, the control apparatus 5 has an arithmetic device and a storage device that are not shown in the drawings, and realizes the abovementioned units by execution of a program stored in the storage device by the arithmetic device.

The external apparatus control unit 51 loads data necessary for executing calculation processing on an external memory of an external apparatus, and also causes the external apparatus to execute the calculation processing.

The memory access unit 52 converts a logical address used in calculation processing to a physical address, and also accesses an external memory on the basis of the converted physical address.

The external memory virtualizing unit 93 associates a converted physical address with an external memory physical address that is a physical address in an external memory, and thereby virtualizes the external memory.

Thus, the control apparatus 5 in this exemplary embodiment has the external memory virtualizing unit 53. With such a configuration, the external memory virtualizing unit 53 can virtualize an external memory by associating a converted physical address with an external memory physical address that is a physical address in the external memory. Consequently, it is possible to utilize an external memory without being limited to the size of a physical address that can be reserved by the control apparatus 5. As a result, it is possible to efficiently utilize an external memory.

Further, the control apparatus 5 can be realized by installation of a predetermined program into the control apparatus 5. To be specific, a program as another aspect of the present invention is a program including instructions for causing an information processing apparatus to realize: an external apparatus control unit 51 configured to load data necessary for execution of calculation processing onto an external memory included by an external apparatus and also cause the external apparatus to execute the calculation processing; a memory access unit 52 configured to convert a logical address used in the calculation processing into a physical address and also access the external memory on a basis of the converted physical address; and an external memory virtualizing unit 53 configured to virtualize the external memory by associating the converted physical address with an external memory physical address that is a physical address in the external memory.

Further, a control method executed by the control apparatus 5 is a method executed by a control apparatus, and the method includes: loading data necessary for execution of calculation processing onto an external memory included by an external apparatus and also causing the external apparatus to execute the calculation processing; converting a logical address used in the calculation processing into a physical address and also accessing the external memory on a basis of the converted physical address; and virtualizing the external memory by associating the converted physical address with an external memory physical address that is a physical address in the external memory.

The inventions of the program and the control method with the above configurations have the same actions as the control apparatus 5, and therefore, can achieve the object of the present invention.

Further, the object of the present invention can also be achieved by the information processing apparatus 6 as shown in FIG. 12. With reference to FIG. 12, the information processing apparatus 6 has a control node 7 and a calculation node 8.

The calculation node 8 is controlled by the control node 7. The calculation node 8 has a memory 81.

In the control node 7, an operation system is installed. With reference to FIG. 12, the control node 7 has an external apparatus control unit 71, a memory access unit 72, and an external memory virtualizing unit 73. For example, the control node 7 has an arithmetic device and a storage device that are not shown in the drawings, and realizes the abovementioned units by execution of a program stored in the storage device by the arithmetic device.

The external apparatus control unit 71 loads data necessary for executing calculation processing into the memory 81 of the calculation node 8, and also causes the calculation node 8 to execute the calculation processing.

The memory access unit 72 converts a logical address used in calculation processing into a physical address, and accesses the memory 81 on the basis of the converted physical address.

The external memory virtualizing unit 93 virtualizes the memory 81 by associating a converted physical address with an external memory physical address that is a physical address in the memory 81.

The information processing apparatus 6 having such a configuration can also achieve the object of the present invention in the same manner as the control apparatus 5.

<Supplementary Notes>

The whole or part of the exemplary embodiments disclosed above can be described as the following supplementary notes. Below, the overview of a control apparatus and so on according to the present invention will be described. However, the present invention is not limited to the following configurations.

(Supplementary Note 1)

A control apparatus comprising:

an external apparatus control unit configured to load data necessary for execution of calculation processing onto an external memory included by an external apparatus and also cause the external apparatus to execute the calculation processing;

a memory access unit configured to convert a logical address used in the calculation processing into a physical address and also access the external memory on a basis of the converted physical address; and an external memory virtualizing unit configured to virtualize the external memory by associating the converted physical address with an external memory physical address that is a physical address in the external memory.

(Supplementary Note 2)

The control apparatus according to Supplementary Note 1, comprising:

a storage device; and a saving unit configured to save data stored in the external memory into the storage device, wherein the saving unit is configured to, when a content of the calculation processing executed by the external apparatus is changed by the external apparatus control unit, save data for the calculation processing stored in the external memory into the storage device.

(Supplementary Note 3)

The control apparatus according to Supplementary Note 2, comprising a transfer device control unit configured to control a transfer device directly transferring data from a memory in which data is stored to another memory, wherein the transfer device control unit is configured to prohibit data transfer by the transfer device when the saving unit saves data.

(Supplementary Note 4)

The control apparatus according to Supplementary Note 3, wherein the external memory virtualizing unit is configured to, when a content of the calculation processing executed by the external apparatus is changed by the external apparatus control unit, release at least the converted physical address of information associating the converted physical address with the external memory physical address in a case where data for the calculation processing stored in the external memory is not a target of transfer by the transfer device.

(Supplementary Note 5)

The control apparatus according to Supplementary Note 3 or 4, comprising an address update unit configured to, in a case where data saved by the saving unit is a target of transfer by the transfer device, change a physical address on a transfer address list from an address used in access to the external memory to an address of the storage device that is a saving destination, the transfer address list being used by the transfer device when transferring data.

(Supplementary Note 6)

The control apparatus according to Supplementary Note 5, wherein:

the saving unit is configured to, when the calculation processing by the external apparatus ends, save data for the calculation processing loaded on the external memory into the storage device; and the address update unit is configured to change a physical address on the transfer address list from an address of the external memory to an address of the storage device that is a saving destination.

(Supplementary Note 7)

The control apparatus according to any of Supplementary Notes 1 to 6, comprising a relocation unit configured to relocate fragmented data in the external memory into continuous regions.

(Supplementary Note 8)

A control method executed by a control apparatus, the control method comprising:

loading data necessary for execution of calculation processing onto an external memory included by an external apparatus and also causing the external apparatus to execute the calculation processing;

converting a logical address used in the calculation processing into a physical address and also accessing the external memory on a basis of the converted physical address; and virtualizing the external memory by associating the converted physical address with an external memory physical address that is a physical address in the external memory.

(Supplementary Note 9)

The control method according to Supplementary Note 8, comprising:

when a content of the calculation processing executed by the external apparatus is changed, saving data for the calculation processing stored in the external memory into a storage device included by the control apparatus.

(Supplementary Note 10)

The control method according to Supplementary Note 9, comprising:

when saving data for the calculation processing stored in the external memory into the storage device included by the control apparatus, prohibiting data transfer by a transfer device, the transfer device directly transferring data from a memory in which data is stored to another memory.

(Supplementary Note 11)

The control method according to Supplementary Note 10, comprising:

when a content of the calculation processing executed by the external apparatus is changed, releasing at least the converted physical address of information associating the converted physical address with the external memory physical address in a case where data for the calculation processing stored in the external memory is not a target of transfer by the transfer device.

(Supplementary Note 12)

The control method according to Supplementary Note 10, comprising:

in a case where saved data is a target of transfer by the transfer device, changing a physical address on a transfer address list from an address used in access to the external memory to an address of the storage device that is a saving destination, the transfer address list being used by the transfer device when transferring data.

(Supplementary Note 13)

The control method according to Supplementary Note 12, comprising:

when the calculation processing by the external apparatus ends, saving data for the calculation processing loaded on the external memory into the storage device; and changing a physical address on the transfer address list from an address of the external memory to an address of the storage device that is a saving destination.

(Supplementary Note 14)

The control method according to Supplementary Note 8, comprising:

relocating fragmented data in the external memory into continuous regions.

(Supplementary Note 15)

A non-transitory computer-readable medium storing a program comprising instructions for causing an information processing apparatus to realize:

an external apparatus control unit configured to load data necessary for execution of calculation processing onto an external memory included by an external apparatus and also cause the external apparatus to execute the calculation processing;

a memory access unit configured to convert a logical address used in the calculation processing into a physical address and also access the external memory on a basis of the converted physical address; and an external memory virtualizing unit configured to virtualize the external memory by associating the converted physical address with an external memory physical address that is a physical address in the external memory.

(Supplementary Note 16)

The non-transitory computer-readable medium storing the program according to Supplementary Note 15, comprising instructions for causing the information processing apparatus to realize a saving unit configured to save data stored in the external memory into a storage device, wherein the saving unit is configured to, when a content of the calculation processing executed by the external apparatus is changed by the external apparatus control unit, save data for the calculation processing stored in the external memory into the storage device.

(Supplementary Note 17)

The non-transitory computer-readable medium storing the program according to Supplementary Note 16, comprising instructions for causing the information processing apparatus to realize a transfer device control unit configured to control a transfer device directly transferring data from a memory in which data is stored to another memory, wherein the transfer device control unit is configured to prohibit data transfer by the transfer device when the saving unit saves data.

(Supplementary Note 18)

The non-transitory computer-readable medium storing the program according to Supplementary Note 17, wherein the external memory virtualizing unit is configured to, when a content of the calculation processing executed by the external apparatus is changed by the external apparatus control unit, release at least the converted physical address of information associating the converted physical address with the external memory physical address in a case where data for the calculation processing stored in the external memory is not a target of transfer by the transfer device.

(Supplementary Note 19)

The non-transitory computer-readable medium storing the program according to Supplementary Note 17, comprising instructions for causing the information processing apparatus to realize an address update unit configured to, in a case where data saved by the saving unit is a target of transfer by the transfer device, change a physical address on a transfer address list from an address used in access to the external memory to an address of the storage device that is a saving destination, the transfer address list being used by the transfer device when transferring data.

(Supplementary Note 20)

The non-transitory computer-readable medium storing the program according to Supplementary Note 19, wherein:

the saving unit is configured to, when the calculation processing by the external apparatus ends, save data for the calculation processing loaded on the external memory into the storage device; and the address update unit is configured to change a physical address on the transfer address list from an address of the external memory to an address of the storage device that is a saving destination.

(Supplementary Note 21)

An information processing apparatus comprising a control node with an operating system installed and a calculation node controlled by the control node, wherein the control node includes:

an external apparatus control unit configured to load data necessary for execution of calculation processing onto a memory included by the calculation node and also cause the calculation node to execute the calculation processing;

a memory access unit configured to convert a logical address used in the calculation processing into a physical address and also access the memory on the basis of the converted physical address; and an external memory virtualizing unit configured to virtualize the memory by associating the converted physical address with an external memory physical address that is a physical address in the memory.

(Supplementary Note 21-1)

The information processing apparatus according to Supplementary Note 21, wherein the control node includes:

a storage device; and a saving unit configured to save data stored in the memory into the storage device, wherein the saving unit is configured to, when a content of the calculation processing executed by the calculation node is changed by the external apparatus control unit, save data for the calculation processing stored in the memory into the storage device.

(Supplementary Note 21-2)

The information processing apparatus according to Supplementary Note 21-1, wherein the control node includes a transfer device control unit configured to control a transfer device directly transferring data from a memory in which data is stored to another memory, wherein the transfer device control unit is configured to prohibit data transfer by the transfer device when the saving unit saves data.

The program disclosed in the exemplary embodiments and supplementary notes described above is stored in a storage device or recorded on a computer-readable recording medium. For example, the recording medium is a portable medium such as a flexible disk, an optical disk, a magneto-optical disk, and a semiconductor memory.

Although the present invention has been described above with reference to the exemplary embodiments, the present invention is not limited to the exemplary embodiments described above. The configurations and details of the present invention can be changed in various manners that can be understood by those skilled in the art within the scope of the present invention.

DESCRIPTION OF REFERENCE NUMERALS 1 parallel computer
10 control node
11 memory
111 device memory saving region
12 CPU
13 data transfer unit
14 processor core
15 DMA engine
16 to-CPU communication function
101 control node OS
1011 MMU
1012 data transfer allowance flag
102 calculation node management unit
1021 process scheduler
1022 calculation node memory saving and restoring unit
1023 data transfer allowance flag update unit
1024 RDMA address update unit
1025 calculation node memory virtualizing unit
1026 relocation unit
103 RDMA device driver
1031 transfer address list
1032 RDMA request queue
1033 data transfer allowance flag check unit
104 surrogate process
20 calculation node
21 memory
210 calculation data
22 CPU
23 data transfer unit
24 processor core, calculation core
240 general-purpose registers
241 control registers
242 exception detection unit
243 registers access unit
244 exception notification unit
201 in-device page table
202 calculation process
25 DMA engine
26 to-CPU communication function
30 internode communication unit
40 RDMA device
5 control apparatus
51 external apparatus control unit
52 memory access unit
53 external memory virtualizing unit
6 information processing apparatus
7 control node
71 external apparatus control unit
72 memory access unit
73 external memory virtualizing unit
8 calculation node
81 memory

The invention claimed is:

1. A control apparatus comprising:
an external apparatus control unit configured to load data necessary for execution of calculation processing onto an external memory included by an external apparatus and also cause the external apparatus to execute the calculation processing;
a memory access unit configured to convert a logical address used in the calculation processing into a physical address and also access the external memory on a basis of the converted physical address;
an external memory virtualizing unit configured to virtualize the external memory by associating the converted physical address with an external memory physical address that is a physical address in the external memory;
a storage device;
a saving unit configured to save data stored in the external memory into the storage device, wherein the saving unit is configured to, when a content of the calculation processing executed by the external apparatus is changed by the external apparatus control unit, save data for the calculation processing stored in the external memory into the storage device; and
a transfer device control unit configured to control a transfer device directly transferring data from a memory in which data is stored to another memory, wherein the transfer device control unit is configured to prohibit data transfer by the transfer device when the saving unit saves data.

2. The control apparatus according to claim 1, wherein the external memory virtualizing unit is configured to, when a content of the calculation processing executed by the external apparatus is changed by the external apparatus control unit, release at least the converted physical address of information associating the converted physical address with the external memory physical address in a case where data for the calculation processing stored in the external memory is not a target of transfer by the transfer device.

3. The control apparatus according to claim 1, comprising an address update unit configured to, in a case where data saved by the saving unit is a target of transfer by the transfer device, change a physical address on a transfer address list from an address used in access to the external memory to an address of the storage device that is a saving destination, the transfer address list being used by the transfer device when transferring data.

4. The control apparatus according to claim 3, wherein:
the saving unit is configured to, when the calculation processing by the external apparatus ends, save data for the calculation processing loaded on the external memory into the storage device; and
the address update unit is configured to change a physical address on the transfer address list from an address of the external memory to an address of the storage device that is a saving destination.

5. The control apparatus according to claim 1, comprising a relocation unit configured to relocate fragmented data in the external memory into continuous regions.

6. A control method executed by a control apparatus, the control method comprising:
loading data necessary for execution of calculation processing onto an external memory included by an external apparatus and also causing the external apparatus to execute the calculation processing;
converting a logical address used in the calculation processing into a physical address and also accessing the external memory on a basis of the converted physical address;
virtualizing the external memory by associating the converted physical address with an external memory physical address that is a physical address in the external memory;

when a content of the calculation processing executed by the external apparatus is changed, saving data for the calculation processing stored in the external memory into a storage device included by the control apparatus; and when saving data for the calculation processing stored in the external memory into the storage device included by the control apparatus, prohibiting data transfer by a transfer device, the transfer device directly transferring data from a memory in which data is stored to another memory.

7. The control method according to claim 6, comprising:
when a content of the calculation processing executed by the external apparatus is changed, releasing at least the converted physical address of information associating the converted physical address with the external memory physical address in a case where data for the calculation processing stored in the external memory is not a target of transfer by the transfer device.

8. The control method according to claim 6, comprising:
in a case where saved data is a target of transfer by the transfer device, changing a physical address on a transfer address list from an address used in access to the external memory to an address of the storage device that is a saving destination, the transfer address list being used by the transfer device when transferring data.

9. The control method according to claim 8, comprising:
when the calculation processing by the external apparatus ends, saving data for the calculation processing loaded on the external memory into the storage device; and
changing a physical address on the transfer address list from an address of the external memory to an address of the storage device that is a saving destination.

10. The control method according to claim 6, comprising:
relocating fragmented data in the external memory into continuous regions.

11. A non-transitory computer-readable medium storing a program comprising instructions for causing an information processing apparatus to realize:
an external apparatus control unit configured to load data necessary for execution of calculation processing onto an external memory included by an external apparatus and also cause the external apparatus to execute the calculation processing;
a memory access unit configured to convert a logical address used in the calculation processing into a physical address and also access the external memory on a basis of the converted physical address;
an external memory virtualizing unit configured to virtualize the external memory by associating the converted physical address with an external memory physical address that is a physical address in the external memory;
a saving unit configured to save data stored in the external memory into a storage device, wherein the saving unit is configured to, when a content of the calculation processing executed by the external apparatus is changed by the external apparatus control unit, save data for the calculation processing stored in the external memory into the storage device; and
a transfer device control unit configured to control a transfer device directly transferring data from a memory in which data is stored to another memory, wherein the transfer device control unit is configured to prohibit data transfer by the transfer device when the saving unit saves data.

12. The non-transitory computer-readable medium storing the program according to claim 11, wherein the external memory virtualizing unit is configured to, when a content of the calculation processing executed by the external apparatus is changed by the external apparatus control unit, release at least the converted physical address of information associating the converted physical address with the external memory physical address in a case where data for the calculation processing stored in the external memory is not a target of transfer by the transfer device.

13. The non-transitory computer-readable medium storing the program according to claim 11, comprising instructions for causing the information processing apparatus to realize an address update unit configured to, in a case where data saved by the saving unit is a target of transfer by the transfer device, change a physical address on a transfer address list from an address used in access to the external memory to an address of the storage device that is a saving destination, the transfer address list being used by the transfer device when transferring data.

14. The non-transitory computer-readable medium storing the program according to claim 13, wherein:
the saving unit is configured to, when the calculation processing by the external apparatus ends, save data for the calculation processing loaded on the external memory into the storage device; and
the address update unit is configured to change a physical address on the transfer address list from an address of the external memory to an address of the storage device that is a saving destination.

* * * * *